4 Sheets—Sheet 1.

G. BOXLEY.
Machine for Folding Blanks for Collars and Cuffs.
No. 199,615. Patented Jan. 29, 1878.

WITNESSES:
James H. Slade,
James T. Goodfellow.

INVENTOR:
George Boxley

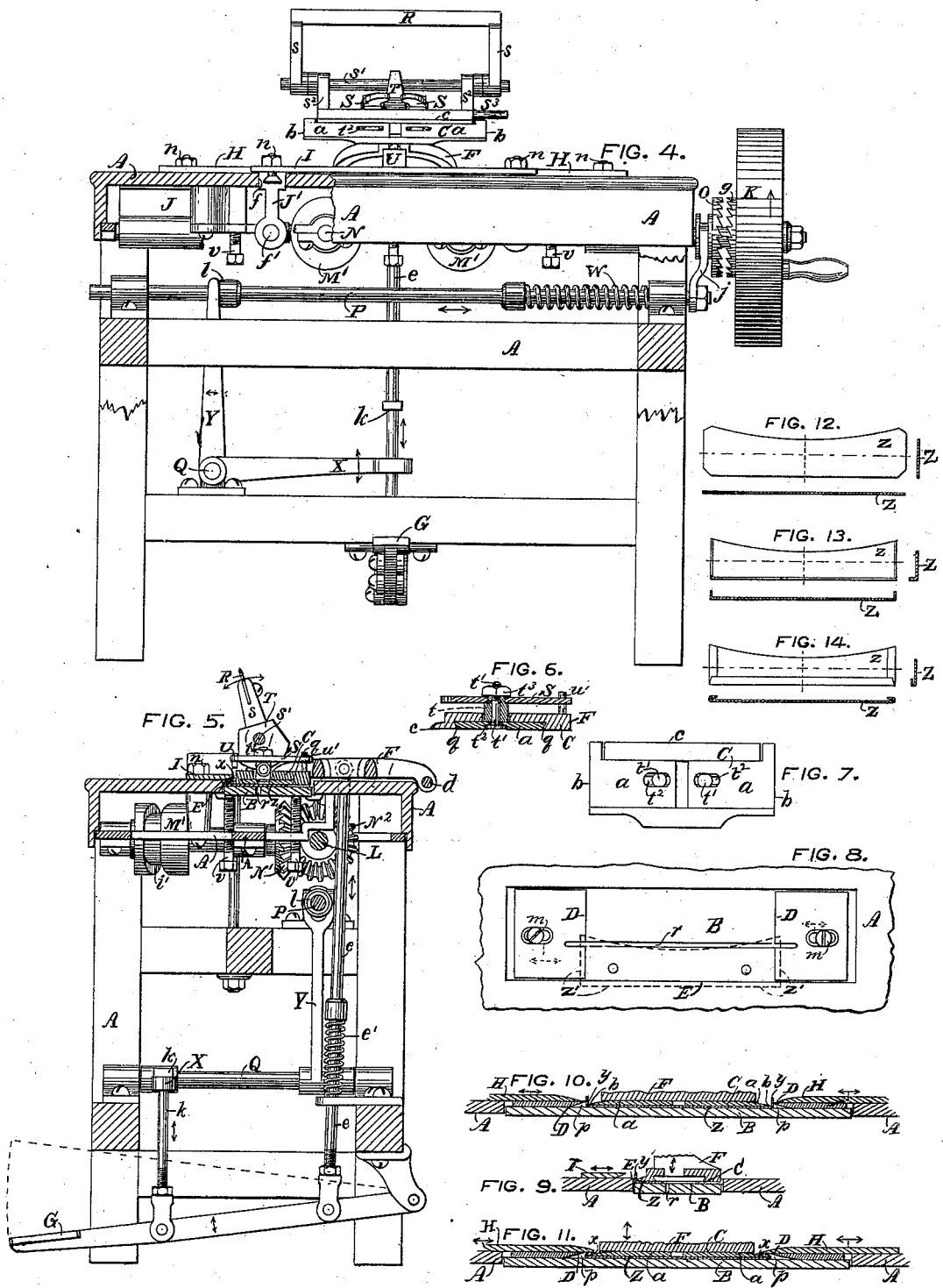

4 Sheets—Sheet 3.
G. BOXLEY.
Machine for Folding Blanks for Collars and Cuffs.
No. 199,615. Patented Jan. 29, 1878.
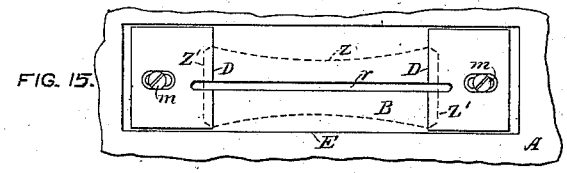
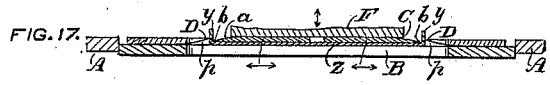
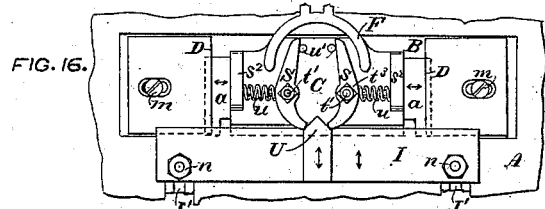
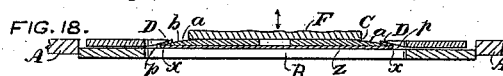
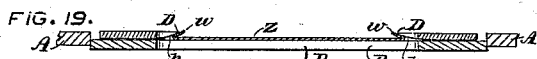
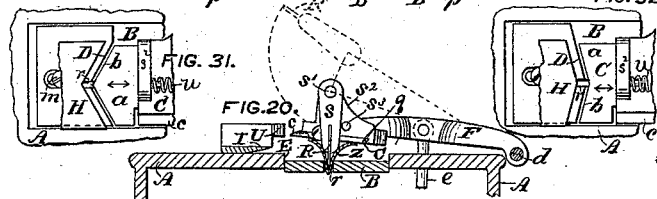
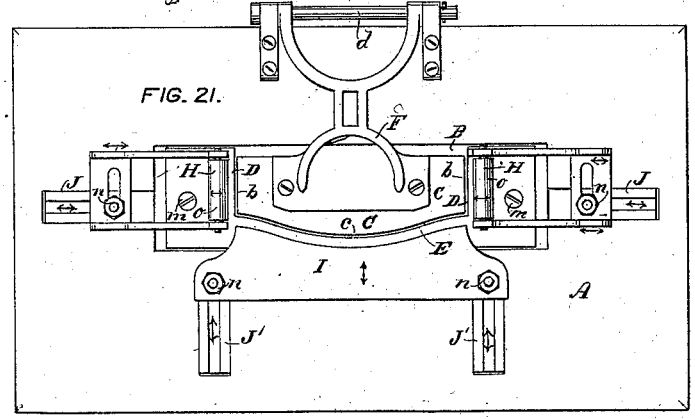
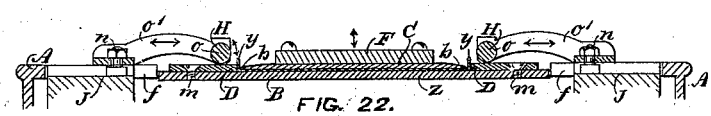
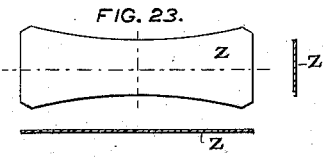
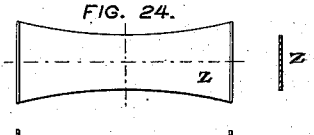
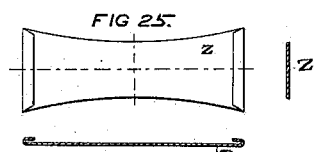
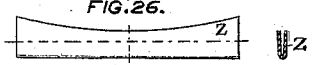
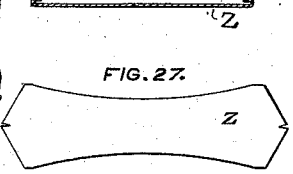
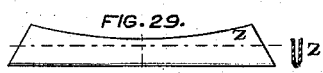
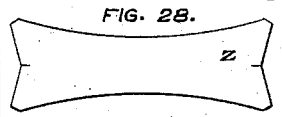
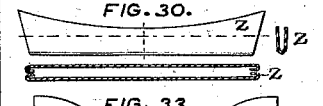
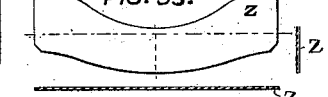
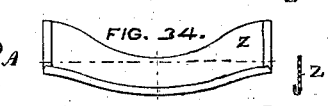
WITNESSES:
James H. Slade,
James T. Goodfellow.
INVENTOR:
George Boxley
N. PETERS, PHOTO-LITHOGRAPHER, WASHINGTON, D. C.

G. BOXLEY.
Machine for Folding Blanks for Collars and Cuffs.
No. 199,615. Patented Jan. 29, 1878.
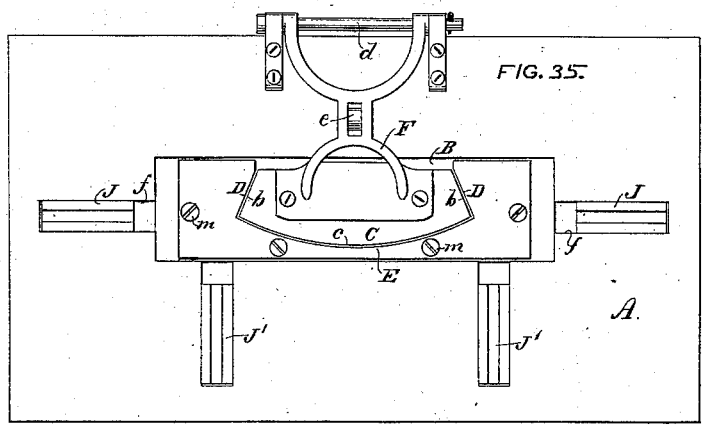
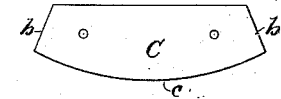
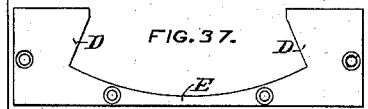
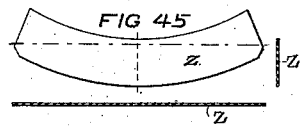
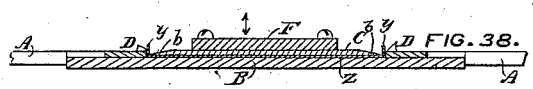
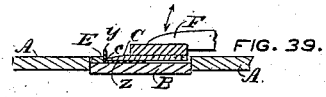
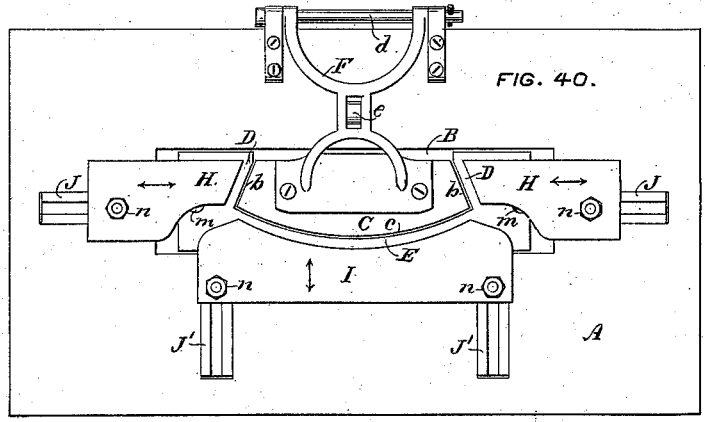
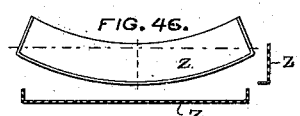
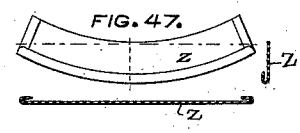
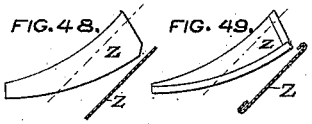
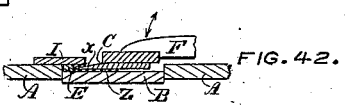
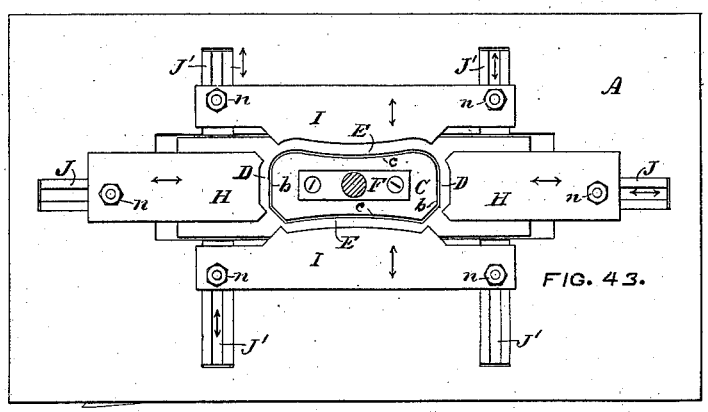
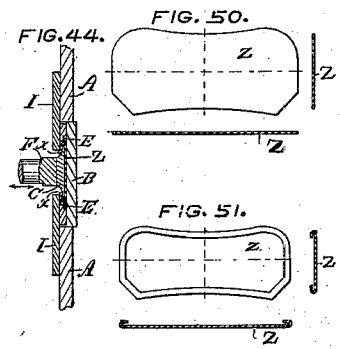
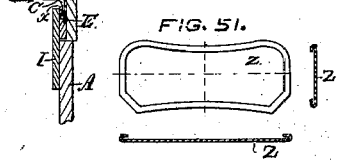
WITNESSES:
James H. Slade,
James T. Goodfellow.
INVENTOR:
George Boxley

UNITED STATES PATENT OFFICE.

GEORGE BOXLEY, OF TROY, NEW YORK, ASSIGNOR OF ONE-HALF HIS RIGHT TO ISAAC V. FORD, OF SAME PLACE.

IMPROVEMENT IN MACHINES FOR FOLDING BLANKS FOR COLLARS AND CUFFS.

Specification forming part of Letters Patent No. 199,615, dated January 29, 1878; application filed September 19, 1877.

*To all whom it may concern:*

Be it known that I, GEORGE BOXLEY, of the city of Troy, in the county of Rensselaer and State of New York, have invented certain new and useful Improvements in Machines for Folding Blanks for Collars and Cuffs and similar articles, and of which invention the following is a specification, reference being had to the accompanying drawings, in which—

Figure 1:
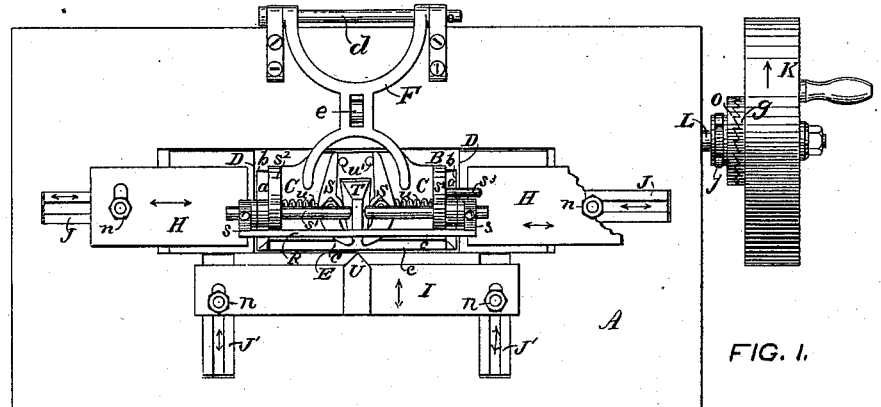
Figure 2:
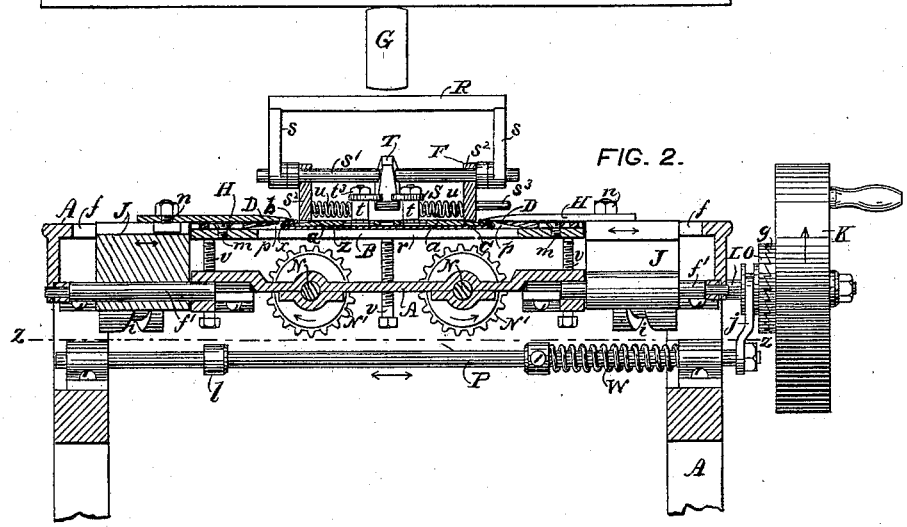
Figure 3:
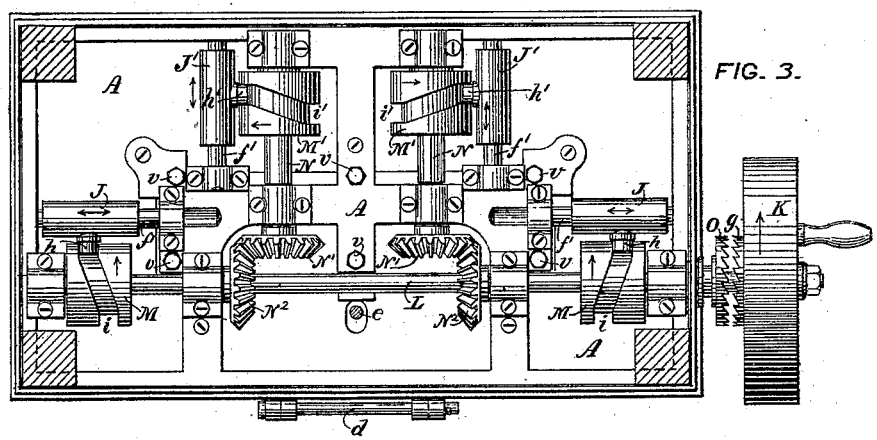

Figure 1 is a plan of the top, Fig. 2 an elevation of a vertical longitudinal section of the upper part, and Fig. 3 a plan of the under side of the portion above the plane *z z* in Fig. 2, all of a machine which embodies the distinguishing features of this invention. Fig. 4 is a front side elevation and partial section of the same machine; Fig. 5, an elevation of a transverse section thereof, and Fig. 6 a section of a part of the same on a larger scale. Fig. 7 is a plan of the under side of the presser; Fig. 8, a plan of the bed with end and side ledges; Fig. 9, a transverse section, and Figs. 10 and 11 longitudinal sections, of some parts of the same machine. Fig. 12 shows a plan, transverse section, and longitudinal section of a blank for a part of a collar, ready to be acted upon by the machine. Fig. 13 represents a plan, transverse section, and longitudinal section of the same blank having one side edge and both end edges turned up as by the machine; and Fig. 14 shows a plan, transverse section, and longitudinal section of the same blank having one side edge and two end edges folded as by the same machine. Figs. 15 and 16 are plans, Figs. 17, 18, and 19, longitudinal sections, and Fig. 20 a transverse section, of parts of the machine represented in Figs. 1, 2, 3, 4, and 5; and Fig. 21 is a plan, and Fig. 22 a longitudinal section, of a part of the same machine, having modified end folders. Figs. 23, 24, 25, and 26 each represent a collar-blank in plan, transverse section, and longitudinal section, first as cut out, next with the ends turned up, next with the ends folded down, and finally with the ends folded and the whole folded longitudinally in the middle, as done by the machine. Figs. 27 and 28 are plans of differently-shaped collar-blanks as cut out; and Figs. 29 and 30 respectively represent the same blanks folded longitudinally in the middle, with the ends folded inward, as done by the same machine. Figs. 31 and 32 show the shapes of the ends of the presser, ledges, and folders, respectively, suitable for folding the ends of the blanks shown in Figs. 27 and 28. Fig. 33 shows a plan and sections of a blank of proper shape to be folded by the presser, ledges, and folders shown in Fig. 21; and Fig. 34 represents a plan and sections of the same blank having its side and end edges thus folded. Fig. 35 is a plan of a portion of the machine represented in Figs. 1, 2, 3, 4, and 5, but having the end and side folders removed, and the presser and side ledges of a different shape, as represented in separate plans in Figs. 36 and 37; and Fig. 38 is a longitudinal section, and Fig. 39 a transverse section, of parts of the same. Fig. 40 is a plan of a portion of the same machine, but having the presser and side and end ledges of the form shown in Figs. 36 and 37, and correspondingly-shaped side and end folders; and Fig. 41 is a longitudinal section, and Fig. 42 a transverse section, of a part of the same. Fig. 43 is a plan of a portion of the same machine, but with the presser, end and side ledges, and end and side folders of shapes suitable for folding all the edges of blanks for cuffs; and Fig. 44 is a transverse section of a portion of the same. Figs. 45, 46, and 47 each show a plan, transverse section, and longitudinal section of a collar-blank corresponding in shape to the forms of the presser and the end and side ledges and folders shown in Figs. 35, 36, 37, and 40, first as cut out, next as having the edges of the ends and one side turned up, and next as having its side and end edges folded down. Fig. 48 is a plan and section of a blank for one side of one-half of a collar, and corresponding in shape to that of a portion of the presser and end and side ledges and folders shown in Figs. 35 and 40; and Fig. 49 is a plan and section of the same blank having one side edge and one end edge folded. Fig. 50 shows a plan, cross-section, and longitudinal section of a blank for one side of a cuff shaped to suit the presser, end and side ledges, and end and side folders shown in Fig. 43; and Fig. 51 presents a plan, transverse section, and longitudinal section of the same blank having all its edges folded.

Like parts are marked by like letters in the different figures, and the arrows therein indicate the directions in which the adjacent parts move or are movable while in operation.

The primary object of this invention is to produce a machine by the use of which a person can conveniently, quickly, and accurately fold one, two, or more of the edges of blanks of linen or cotton cloth for collars, collar-bands, or cuffs, preparatory to stitching the same.

In the aforesaid drawings, A is the stationary portion or frame of the machine, of any suitable construction. B is a stationary bed on which the blanks Z are held while having their edges turned up and folded down, and which bed is adjustable vertically by set-screws $v$, Figs. 2 and 5, to receive blanks of different thicknesses. C is a presser, shaped along its end edges $b$ and side edge $c$ to conform to the corresponding edges of the particular form of blank to be operated upon. D D are end ledges secured to the bed B, and shaped to fit the ends $b$ of the presser. E is a side ledge secured to the bed B or to the part A, or formed with the latter, and corresponding in shape to the side edge $c$ of the presser. The presser C is mounted on a reciprocating or vibrating support or lever, F, which is secured by a pivot-bolt, $d$, to the frame A, and is connected by a rod, $e$, Fig. 5, to a foot-lever, G, and furnished with a retracting-spring, $e'$, so that by depressing the lever G the presser C will be pressed down upon the bed B, as in Fig. 5, and by releasing the lever G the spring $e'$ will elevate that lever with the rod $e$, and thereby raise the presser C off from the bed, as in Fig. 4.

The ledges D and E are so arranged in respect to the presser C that when the latter is pressed down upon a suitable blank, Z, properly placed on the bed, with the edges of the blank extending over the ledges, as indicated in Figs. 8 and 15 by dotted lines at Z', the edges of the blank will then be turned upward by and between the ledges and the edges of the presser, substantially as indicated at $y$ in Figs. 9, 10, 17, 22, 38, and 39.

I make the end-edge parts $b$ and the side-edge part $c$ of the presser C thin or blade-like, in order that when the edges of the blank Z shall be turned over and down upon the edges of the presser, as indicated at $x$ in Figs. 2, 5, 11, 18, 41, 42, and 44, only the one single sharp crease or fold required shall be thereby made on each folded edge of the blank.

I make the end ledges D and side ledge E low or thin and of uniform height throughout, and level or even on top, and in respect to the thin side and end edges $c\ b$ of the presser, substantially as shown in the drawings, in order that when the edges of the cloth blank shall be turned up by and between the ledges and the adjacent edges of the presser, as indicated at $y$ in Figs. 9, 10, 17, 22, 38, and 39, those turned-up edges of the blank can then be turned and folded inward closely over the thin edges of the presser by moving a suitable plate, roller, or smoothing-iron upon and across the ledges, and thence over the adjacent edges of the presser.

In order to furnish means by which a person can conveniently, quickly, and accurately fold upon the thin edges $b\ c$ of the presser the edges $y$ of the cloth blank previously turned up by and between the edges of the presser and the ledges D E, I mount suitable end and side folders H and I on movable carriers J J', that are fitted to slide to and fro on and along suitable stationary ways or guides $f\ f$, constructed and arranged so that a person can conveniently move by hand the several folders H I inward across the ledges D E and over the edges $b\ c$ of the presser, respectively, and thus fold inward the previously-upturned edges of the blank closely upon the edges of the presser, as indicated at $x$ in Figs. 2, 5, 11, 41, 42, and 44, and can also move the same folders outward away from over the edges of the presser, as indicated in Figs. 1, 9, 10, 20, 21, 40, and 43, to permit the presser to be raised from the bed, and the folded blank removed and a new blank placed on the bed, and the presser again forced down thereon, so as to turn up the edges of the blank between the edges of the presser and the ledges.

In order to automatically cause the proper to-and-fro movements of the end folders H and side folder I, first inward across the end and side ledges D E and over the end and side edges $b\ c$ of the presser C, and next outward away therefrom, whenever, and only when, the presser shall be pressed upon the bed, or upon a suitable blank thereon, I intermittingly connect the folders H I and presser C with a constantly-revolving shaft, wheel, or pulley by means of any suitable mechanism. For instance: In the drawings, K is a rotary wheel, which is mounted loosely on a rotary shaft, L, and which is to be revolved by any suitable means, and has clutch-teeth $g$ fast thereon. Each carrier J, Fig. 3, of each end folder H, has a follower, $h$, which extends into the groove $i$ of a cam, M, fast on the shaft L; and each carrier J' of the side folder I has a follower, $h'$, that is in the groove $i'$ of a cam, M', which is fast on a rotary shaft, N, that has fast thereon a bevel-gear, $N^1$, which engages with a bevel-gear, $N^2$, that is fast on the shaft L. On the shaft L is a clutch, O, which necessarily revolves with that shaft, and is movable endwise thereon into and out of engagement with the clutch-teeth $g$ of the driving-pulley K by means of a forked arm, $j$, Fig. 4, fast on a sliding rod, P, on which is a spring, W, that disengages the clutch O from the driving-pulley K, as shown in Figs. 3 and 4, whenever the strength of that spring is not overcome. The foot-lever G, which is connected by the rod $e$, Fig. 5, with the lever F that carries the presser C, has pivoted thereto a headed bolt, $k$, extending through and above a lateral arm, X, Fig. 4, fast on the rock-shaft Q, which has a standing arm, Y, arranged to bear against a collar, $l$, on the clutch-rod.

Whenever the presser C shall be pressed upon the bed D by depressing the foot-lever G, as shown in Fig. 5, the headed bolt $k$ will then depress the arm X, and thereby cause the arm Y to move the rod P endwise in opposition to the spring W, and thereby engage the clutch O with the clutch-teeth $g$ of the driving-pulley K, as represented in Figs. 1 and 2, and thus cause the rotation of the shaft L, and the turning of the cams M M', and the consequent to-and-fro movement of the carriers J J', and the to-and-fro movement of the folders H I, first inward across the ledges D E and over the edges $b\ c$ of the presser, and next outward away from over the edges of the presser and ledges; and whenever the presser C shall be raised off from the bed B upon removing or sufficiently relaxing the downward pressure exerted on the lever G, the latter lever, with the bolt $k$, will then be raised by the action of the springs W $e'$, so as to release the arms X and Y and let the spring W disengage the clutch O from the driving-pulley K, as shown in Figs. 3 and 4, and thereby stop the to-and-fro movements of the folders.

In using the machine, the person operating it will remove or relax the downward pressure on the lever G, so as to cause the elevation of the presser C, and the stopping of the to-and-fro movements of the folders H I only when the folders shall be removed from over the edges of the presser, as indicated in Figs. 1, 9, 10, 20, 21, 22, 40, and 43.

The end and side folders H H I can each be in the form of a plate, as shown in Figs. 1, 2, 5, 9, 10, 11, 20, 40, 41, 42, 43, and 44; and in some cases, when the edges to be folded on the blanks are straight or nearly so, the folders can be in the form of rollers, as indicated in Figs. 21 and 22, wherein each end folder H consists of a roller, $o$, journaled in a support, $o'$, adjustably and detachably secured to the carrier J by a screw bolt and nut, $n$.

Figs. 43 and 44 show two side folders, I I, each of which is adjustably and detachably secured by screw bolts and nuts $n$ to a separate pair of sliding carriers, J' J', and in that case the second set of carriers is to be moved to and fro by means of a second set of cams and devices, substantially such as are shown in Fig. 3, and hereinbefore specified, for moving to and fro the one set of carriers J' J' shown in that figure.

In carrying out this invention, the end and side edges $b\ c$ of the presser C and the corresponding end and side ledges D E and end and side folders H I are severally to be shaped to suit the particular forms of the edges to be folded on the blanks, whatever shall be the shapes thereof.

Thus, for example, in Figs. 1, 4, 7, 8, 15, and 16, the straight and parallel end edges $b\ b$ and straight side edges $c$ of the presser, the straight end and side ledges D D E, and the straight end and side folders H H I are all suitable for use in folding the straight side edge and end edges of the blank represented in Figs. 12, 13, and 14; and the straight and parallel ends $b\ b$ of the presser, and the straight and parallel end ledges D D, and end folders H H represented in Figs. 1 and 21 are suitable for folding the straight parallel end edges of the blank shown in Figs. 23, 24, and 25.

In Fig. 31 the projecting angular end edge $b$ of the presser and the corresponding re-entering angular end ledge D and end folder H are suitable for folding the projecting angular end edges of the blank shown in Fig. 27; and in Fig. 32 the re-entering angular end edge $b$ of the presser and the corresponding inwardly-projecting angular end ledge D and end folder H are of proper shapes for folding the re-entering angular end edges of the blank represented in Fig. 28.

In Fig. 21 the straight and parallel end edges $b\ b$ and curved side edge $c$ of the presser, the straight and parallel end ledges D D and curved side ledge E, and the straight rolling end folders H H and curved sliding side folder I are suitable for turning up and folding down the straight parallel end edges and the curved side edge of the blank shown by Figs. 33 and 34.

In Figs. 35, 36, 37, and 40, the straight inclined end edges $b\ b$ and convexly-curved side edge $c$ of the presser, and the corresponding straight inclined end ledges D D and end-folders H H, and concavely-curved side ledge E and side folder I are suitable for turning and folding the straight inclined end edge or edges and the convex side edge of the blanks represented in Figs. 45, 46, 47, 48, and 49.

In Fig. 43 the end edges $b\ b$ and side edges $c\ c$ of the presser, the corresponding end ledges D D and side ledges E E, and the end folders H H and side folders I I are all of suitable form for turning and folding the two end edges and the two side edges of the cuff-blank represented in Figs. 50 and 51.

In the apparatus represented by the accompanying drawings, the presser C, end and side ledges D D E, and end and side folders H H I, when of proper shape for folding the edges of blanks of a particular form, can all be readily changed for a presser, end and side ledges, and end and side folders of different shapes, suitable for folding the edges of blanks of other forms. Thus, for instance, upon disconnecting the rod $e$, Fig. 5, from the lever F, and removing the pivot-bolt $d$, the presser C shaped and arranged as shown in Figs. 21, 31, 32, 35, or 43 can be substituted for the presser C shaped and arranged as represented in Figs. 1, 4, 16, and 20; and by means of the removable screws $m$, by which the end and side ledges are detachably secured to the bed, the end ledges D or end and side ledges D and E, shaped as shown in Fig. 21, 31, 32, 35, or 43, can be easily substituted for use instead of the end and side ledges shown in Fig. 1; and also, by means of the screw nuts and bolts $n$, by which the end and side folders are adjustably and detachably secured to the dovetailgrooved upper sides of the sliding carriers J J', respectively, the end folders H, or end and side folders H and I, as shown in Fig. 21, 31, 32, 40, or 43, can be quickly substituted and used in place of the end and side folders represented in Fig. 1.

In Figs. 1, 2, 8, 10, 11, 15, 16, 17, 18, 19, 31, and 32, each end ledge D is undercut or beveled underneath from its upper inner edge, so as to leave a recess, $p$, Figs. 2, 10, 11, 17, 18 and 19, under and along each ledge, and the presser C has its end parts $a\,a$ in Figs. 1, 2, 4, 7, 10, 11, 16, 17, 18, 31, and 32, movable endwise to and fro, outward and inward, in or upon suitable ways or guides $q$. (Shown in cross-section in Figs. 5, 6 and 9, and in end view in Fig. 20.)

With that construction, when the presser C is forced down upon a suitable blank, Z, on the bed B, so as to turn up the edges of the blank by and between the ends $b\,b$ of the presser and the end ledges D D, as shown at $y$ in Figs. 10 and 17, a person can then, by hand, slide the end parts $a\,a$ of the presser outward, so that the thin, blade-like end edges $b\,b$ thereof shall force the end parts of the blank outward into the recesses $p$, and thereby fold the turned-up end edges of the blank inward and closely down upon the end edges of the presser, as shown in Fig. 18, and thereupon the person can, by hand, slide back the end parts $a\,a$ of the presser from under the end ledges D D, so that the presser C can be elevated above and away from the bed and ledges, while the folded ends of the blank shall be left in the recesses $p$ under the end ledges, as indicated at $w$ in Fig. 19.

The retention of the folded ends of the blank in the recesses $p$ under the end ledges is of importance in folding blanks of the kind represented in Figs. 23, 24, 25, 27, and 28, which require to be folded lengthwise in the middle, as shown in Figs. 26, 29, and 30, after having the ends folded, as indicated in Fig. 25. For use in thus folding such blanks lengthwise, I construct the bed B with a longitudinal slot, $r$, Figs. 5, 8, 15, 20, which extends through the bed and into the end ledges D; and on the carrier F of the presser I mount a blade, R, upon arms $s$ secured to a rod, $s^1$, that can be turned in standards $s^2$ fast on the carrier. The blade R is to be left above the presser, as indicated in Figs. 2, 4, or 5, until the ends of the blank shall have been folded and left in the recesses $p$ under the ledges, as in Fig. 19, and the presser C elevated above the bed, as in Fig. 4; then the person operating the machine turns down the blade R by hand until an arm, $s$, shall be against a stop, $s^3$, when the blade R will be in the proper place over the slot $r$, and then the person moves down the presser until the blade R forces the end-folded blank into the slot $r$, as indicated in Fig. 20, and thereby folds the blank lengthwise, as represented in Figs. 26, 29, or 30. The person next elevates the presser, removes the folded blank, and turns back the blade R above the presser, preparatory to folding the ends of another blank on the bed and into the recesses $p$ under the ledges D by means of the movable end blades $a\,a$ of the presser.

Each sliding end blade $a$ of the presser C has a stud, $t$, Fig. 6, adjustably secured thereto by a screw-bolt, $t^1$, having a countersunk head fitting in a flanged slot, $t^2$, Fig. 7, in the blade, and extending through that slot and through the stud $t$, and having at the top a nut, $t^3$, screwed down against the top of the stud $t$, which has at its upper part a neck and shoulder, (shown in Fig. 6,) on and between which and the nut $t^3$ is pivoted a lever, S, Figs. 1, 2, 5, 6, and 16. Between and connected with the studs $t\,t$ and the standards $s^2\,s^2$ are springs $u\,u$, which constantly tend to retract and force inward the end blades $a\,a$ of the presser. A cam, T, is fastened on the rod $s^1$, and is arranged between the studs $t\,t$ or levers S S, which latter have their rear arms arranged to bear against studs $u'$ on the carrier F, so that a person, by turning in one direction the arms $s$ with the shaft $s^1$ and cam T, can cause that cam to move outward the levers S S, and thereby slide outward the end blades $a\,a$ into the recesses $p\,p$ under the end ledges; and so that by turning the shaft $s'$ with the cam T in the opposite direction the end blades $a\,a$ will be retracted by the action of the springs $u\,u$. By setting the cam T in different positions in respect to the levers S S or studs $t\,t$, or by fastening the studs $t\,t$ at different points along the slots $t^2\,t^2$ in the sliding end blades $a\,a$, those blades can be adjusted so that when on the bed, and retracted, they will extend outward to within greater or less distance from the adjustable end ledges D D, as shall be desirable or necessary in folding the ends of blanks of different thicknesses, or of different lengths, or with folds of various widths.

In order to cause the automatic movement of the end blades $a\,a$ of the presser C first outward into the recesses $p\,p$, under the end ledges D D, and next inward therefrom, in consequence of, and only during, the depression of the presser upon the bed, I arrange a wedge, U, Figs. 1, 16, and 20, fast on the bar I, so that as the latter shall be automatically moved, first inward toward the presser C, and next outward therefrom, by means of the mechanism hereinbefore described, or any equivalent therefor, acting only at and during the depression of the presser upon the bed, the wedge U, in each inward movement of the bar I, shall enter between the forward ends of the levers S S, as indicated in Fig. 16, and thus force outward those levers, and thereby thrust the end blades $a\,a$ of the presser into the recesses $p\,p$, and so that in each backward movement of the bar or folder I the wedge U shall be withdrawn from between the levers S S, and the springs $u\,u$ shall simultaneously retract the end blanks $a\,a$ from the recesses under the end ledges.

By removing or dispensing with the wedge

U the sliding end blades *a a* will be left stationary in the presser, and so as to act in connection with the end ledges D D and end folders H H, as illustrated in Figs. 10 and 11, the same as when the end parts of the presser are in one piece and immovable thereon, as shown in Figs. 21, 22, 35, 38, 40, and 41.

In the machine shown by Figs. 1, 2, 3, 4, and 5 the cams M M', Fig. 3, can be separately detached from the driving mechanism, or from the sliding carriers J J' of the end and side folders H H I, so that only one or two of the folders shall be operated automatically, or so as to permit a person operating the machine to separately move by hand any one or more of the sliding end and side folders, as may be desirable, in folding one, two, or more of the edges of various collar-blanks; and the side and end folders and ledges are so detachable, by means of the screws *m* and screw bolts and nuts *n*, that only one, two, or more of the ledges, with or without the corresponding folder or folders, need be used in connection with the bed B and presser C, whether the end parts of the presser shall or shall not be automatically or otherwise movable to and fro endwise, as shall be desirable in folding one, two, or more of the edges of various collar-blanks.

In using the machine in folding the blank shown in Fig. 12 all the edges of the blank can be simultaneously turned upward, as shown in Figs. 13, 9, 10, and 17, by means of the bed B, presser C, having straight edges *b b c*, and the straight end and side ledges D D E shown in Figs. 1, 2, 5, 6, 7, 8, 9, 10, 11, 15, 16, and 17, and then the turned-up edges of the blank can be folded down upon the edges of the presser by a person moving by hand a suitable smoothing-iron, plate, or roller over and inwardly across the level tops of the end and side ledges and the edges of the presser, when the folders are removed; or the turned-up end and side edges of the blank can be folded down upon the edges of the presser by means of the sliding end and side folders H H I, moved by automatic devices, as hereinbefore described, or by the hands of the person attending the machine whenever such automatic devices shall be detached or dispensed with; or the upwardly-turned side edge of the blank can be thus folded by the folder I, as indicated in Figs. 5 and 16, while the turned-up end edges can be folded by the movable end parts *a a* of the presser being slid outward by the automatic device hereinbefore described, or by the hands of a person operating the machine, so as to force the end parts of the blank into the recesses *p p* under the end ledges, as indicated by Figs. 16 and 18; and in the latter case the end folders H H can be dispensed with, as in Fig. 16, or can be used in combination with the sliding parts *a a* of the presser, as in Fig. 1, to assist the latter in producing a complete and accurate folding down of the ends of the blank when the latter shall be of stiff material, or of two or more thicknesses, or otherwise difficult to fold.

The movable end parts *a a* of the presser are also of much importance when operated, as hereinbefore described, in connection with the end ledges D D when there are no recesses *p p* therein, and the folded blanks are to be freed from the presser, or left on the bed where folded, without opening the folds in the ends of the blanks, the end parts *a a* of the presser being in that case adjusted so that, when pressed upon the blank on the bed, they shall be first moved or movable outward, so as to hold the blank close to or against the end ledges D D, and for the folding down of the ends of the blank upon the ends of the presser, and so that the end parts *a a* shall be next moved or movable inward, so as to clear the folded-down end edges of the blank and allow the presser to be elevated without lifting the folded blank off from the bed or injuriously opening the folds at the ends.

In the machine shown in the drawings the cams M M', Fig. 3, or the gear-wheels, are or can be secured to their respective shafts L N by ordinary set-screws or other well-known devices, so that the cams can be thereby readily adjusted, so as to cause the movement of the folders H H I and end parts *a a* of the presser, either simultaneously or in any desired order and degree of succession; and each of the folders H H I and end parts *a a* of the presser are separately movable, and any one or more of them can be operated automatically by the devices hereinbefore described therefor, or by the hands of a person attending the machine, as shall be necessary or desirable, in folding one or more of the edges of the blank.

What I claim as my invention is—

1. The combination of the bed B, presser C, having the two blade-like end edges *b b*, and the end ledges D D, conformed to the end edges of the presser and elevated above the bed, and having even tops adapted to permit folding-plates to be moved to and fro closely over and across the end ledges and end edges of the presser, as shown and described.

2. The combination of the bed B, presser C, having the blade-like side edge *c* and end edge *b*, and the side ledge E and end ledge D, conformed to the side and end edges of the presser, and elevated above the bed, and having even tops adapted to permit folding-plates to be moved to and fro closely over and across the side and end ledges and the side and end edges of the presser, substantially as shown and described.

3. The combination of the bed B, presser C, having the blade-like end edges *b b*, the end ledges D D, elevated above the bed, and the end folders H H, secured to carriers J J, and thereby movable to and fro closely over and across the end ledges and the end edges of the presser, substantially as shown and described.

4. The combination of the bed B, presser C, having the blade-like end and side edges b and c, the end and side ledges D and E, and the side folder I, secured to carriers J′, and thereby movable to and fro closely over and across the side ledges and the side edge of the presser, substantially as shown and described.

5. The combination of the bed B, presser C, having the end edge b and side edge c, the end ledge D and side ledge E, the end folder H and side folder I, and carriers by which the end and side folders are movable to and fro closely over and across the end and side ledges and end and side edges of the presser, substantially as described.

6. The combination of the bed B, presser C, having the blade-like end edge b, the end ledge D, the end folder H, and mechanism, essentially such as described, whereby the end folder is automatically moved to and fro closely over and across the end ledge and the end edge of the presser only upon depressing the presser onto the bed, as set forth.

7. The combination of the bed B, presser C, having the thin side edge c, the side ledge E, the side folder I, and mechanism, essentially such as described, whereby the side folder is moved automatically to and fro closely over and across the side ledge, and the side edge of the presser only upon the depression of the presser onto the bed, as set forth.

8. The combination of the bed B, presser C, having the end and side edges b c, the end and side ledges D E, the end and side folders H I, and mechanism, essentially such as described, by which the end and side folders are moved automatically to and fro across the end and side ledges and the end and side edges of the presser upon depressing the presser onto the bed, as set forth.

9. The combination of the bed B, ledge D, and presser C, having the edge part a movable toward and from the ledge while the presser is depressed upon a blank on the bed, as shown and described.

10. The combination of the bed B, ledge D, having the recess p therein, and the presser C, having its edge part a movable into and out of the recess in the ledge when the presser is depressed upon a blank on the bed, as shown and described.

11. The combination of the bed B, ledge D, presser C, having the edge part a movable toward and from the ledge, and the folder H movable to and fro over and across the ledge and edge of the presser, when the latter is depressed upon a blank on the bed, substantially as shown and described.

12. The combination of the bed B, ledge D, presser C, having the movable edge part a, and mechanism, substantially as described, by which that edge part of the presser is automatically moved toward and from the ledge upon depressing the presser upon a blank on the bed, as set forth.

13. The combination of the bed B, ledge D, folder H, presser C, having the movable edge part a, and automatic mechanism, substantially as described, by which the said edge part of the presser is moved toward and from the ledge, and the said folder is moved to and fro over and across the ledge and edge of the presser, upon depressing the presser upon a blank on the bed, substantially as shown and described.

14. The combination of the bed B, end and side ledges D E, presser C, having the end and side edges b c, with the edge part a movable toward and from the end ledge, and the side folder I furnished with a carrier, and thereby movable to and fro over and across the side ledge and the side edge of the presser, as set forth.

15. The combination of the bed B, end and side ledges D E, side folder I, presser C, having the side edge c, and movable end edge part a, and automatic mechanism, substantially as described, by which that end edge part of the presser is moved toward and from the end ledge, and the side folder is moved to and fro over and across the side ledge and the side edge of the presser, upon depressing the presser upon a blank on the bed, substantially as shown and described.

16. The combination of the bed B, end and side ledges D E, presser C, having the end and side edges b c, with the end edge part a movable toward and from the end ledge, and the end and side folders H I furnished with carriers, and thereby movable to and fro closely over and across the end and side ledges and the end and side edges of the presser, respectively as shown and described.

17. The combination of the bed B, end and side ledges D E, presser C, having the end and side edges b c, with the end edge part a movable, the end and side folders H I, and automatic mechanism, substantially as described, by which the part a of the presser is moved toward and from the end ledge, and the end and side folders are, respectively, moved to and fro over and across the end and side ledges and end and side edges of the presser, upon depressing the presser upon a blank on the bed, substantially as described.

18. The bed B, having the end ledges D D, formed with the recesses p p under the ledges and the longitudinal slot r, as shown and described.

19. The bed B, having the end ledge D and slot r, in combination with the presser C, having the end edge b conformed to the end ledge, and the blade R adjustable on the presser and in respect to the slot in the bed, substantially as shown and described.

In testimony whereof I hereunto set my hand in the presence of two subscribing witnesses this 17th day of September, 1877.

GEORGE BOXLEY.

Witnesses:
JAMES H. SLADE,
JAMES T. GOODFELLOW.